United States Patent
Kasahara et al.

(10) Patent No.: US 7,077,941 B2
(45) Date of Patent: Jul. 18, 2006

(54) MULTI-LAYER ELECTRODEPOSITION COATING FILM-FORMING METHOD AND COATING PRODUCT FORMED BY THE SAME

(75) Inventors: Naoko Kasahara, Kanagawa-ken (JP); Takeo Ohtani, Kanagawa-ken (JP); Tadayoshi Hiraki, Kanagawa-ken (JP); Akira Tominaga, Kanagawa-ken (JP)

(73) Assignee: Kansai Paint Co.,Ltd., Hyogo-Ken (JP)

( * ) Notice: Subject to any disclaimer, the term of this patent is extended or adjusted under 35 U.S.C. 154(b) by 660 days.

(21) Appl. No.: 10/383,738

(22) Filed: Mar. 10, 2003

(65) Prior Publication Data
US 2003/0221964 A1    Dec. 4, 2003

(30) Foreign Application Priority Data
Mar. 8, 2002    (JP) .............................. 2002-063062
Feb. 3, 2003    (JP) .............................. 2003/026060

(51) Int. Cl.
*C25D 13/06*    (2006.01)

(52) U.S. Cl. ...................... 204/484; 204/505; 204/506; 523/415

(58) Field of Classification Search ................ 204/484, 204/505, 506; 523/415
See application file for complete search history.

(56) References Cited

U.S. PATENT DOCUMENTS

| 4,840,715 A | 6/1989 | Misawa et al. |
| 4,981,759 A * | 1/1991 | Nakatani et al. ............ 428/626 |
| 5,185,065 A * | 2/1993 | Chung et al. ............... 204/503 |
| 6,248,225 B1 | 6/2001 | Palaika et al. |
| 6,423,425 B1 | 7/2002 | Faucher et al. |
| 6,673,853 B1 * | 1/2004 | Muramoto et al. ......... 523/415 |

FOREIGN PATENT DOCUMENTS

| JP | 174277/87 | 7/1987 |
| JP | 333528/96 | 12/1996 |
| JP | 292131/98 | 11/1998 |
| JP | 345394/00 | 12/2000 |
| JP | 234116/01 | 8/2001 |

OTHER PUBLICATIONS

A copy of the European Search Report from applicant's corresponding patent application, May 2004.

* cited by examiner

*Primary Examiner*—Kishor Mayekar
(74) *Attorney, Agent, or Firm*—Fisher, Christen & Sabol

(57) ABSTRACT

A multi-layer electrodeposition coating film-forming method which comprises subjecting a cationic electrodeposition coating composition containing at least two emulsions to an electrodeposition coating, said cationic electrodeposition coating composition being such that a difference in an electrical quantity (a) required for deposition starting between a first coating composition comprising a first emulsion and a second coating composition comprising a second emulsion in two emulsions selected from the at least two emulsions is in the range of 50 to 400 $C/m^2$.

12 Claims, 4 Drawing Sheets

US 7,077,941 B2

MULTI-LAYER ELECTRODEPOSITION COATING FILM-FORMING METHOD AND COATING PRODUCT FORMED BY THE SAME

This application has priority benefit of Japanese Patent Application Number 03/26060, filed on Feb. 3, 2003, that has priority benefit of Japanese Patent Application Number 02/63062, filed on Mar. 8, 2002.

BACKGROUND ART (1) Field of the Invention

The present invention relates to a multi-layer electrodeposition coating film-forming method which is capable of forming a multi-layer electrodeposition coating film showing good properties in weather resistance, corrosion resistance and finished appearance, and in which an electrodeposition coating composition shows good coating composition stability.

(2) Description of the Background Art

The cationic electrodeposition coating composition is widely used in an automobile body, automobile parts, household appliances, equipments, and the like, in that the cationic electrodeposition coating composition can form a coating film showing good properties in weather resistance, corrosion resistance and finished appearance.

The above features of the cationic electrodeposition coating composition resulted an increased application of the electrodeposition coating composition to a coating product formed by a sole electrodeposition coating (hereinafter referred to as a one coat electrodeposition coating), and demands on a cationic electrodeposition coating film showing good properties in both weather resistance and corrosion resistance.

A multi-layer electrodeposition coating film-forming method capable of forming a multi-layer electrodeposition film showing good properties in weather resistance and corrosion resistance as known in the art may include ones disclosed, for example, in Japanese Patent Application Laid-Open Nos. 174277/87, 333528/96, 292131/98, 345394/00, 234116/01 and the like, in which a multi-layer electrodeposition coating film-forming method to result a layer separation in the coating film by having a difference between a solubility parameter (SP) value of the acrylic resin showing good weather resistance and a solubility parameter (SP) value of the epoxy resin showing good corrosion resistance is disclosed.

In the case where a cationic electrodeposition coating composition contains at least two resins having respective solubility parameters different from each other, a wet coating film formed by the electrodeposition coating has such a hardness as not to have a finger mark thereon, so that a shortened heat-curing time from the standpoints of shortening of coating steps an energy savings makes difficult a migration of the acrylic resin to a surface layer of the coating film and a migration of the epoxy resin to an interface with the steel plate only by hot air flow on heat-curing. Particularly, in the case of a thick parts such as a wheel, under parts and the like, a shortened heat-curing time and difficulties in temperature rise may form a coating film comprising a mixed layer of an acrylic resin layer and an epoxy resin layer, resulting in obtaining a coating film showing unsatisfactory properties both weather resistance and corrosion resistance.

Further, the cationic electrodeposition coating composition in the coating line may be subjected to prolonged shears or loads, for example, circulation of the coating composition by a pump, ultrafiltration (UT), fine filtration, vaporization of solvent, inclusion of admixtures such as a chemical solution, degreasing solution and the like, showering with a recovered washing water, settling and diffusion of the coating composition in the bath, and the like.

A large difference in the solubility parameter between resins contained in the cationic electrodeposition coating composition under the above conditions produce various problems, for example, coating composition, stability problem, reduction in finished appearance, increase of filter exchange frequency due to blockage of fine filtration, increase of a taken-out amount of the coating composition due to reduction of ultrafilter-permeating amount, increase of cleaning frequency due to settling of the coating composition, and the like.

Such being the case, a multi-layer electrodeposition coating film-forming method capable of making possible an easy layer separation with a cationic electrodeposition coating composition showing good stability is highly demanded.

SUMMARY OF THE INVENTION

The present inventors made intensive studies for the purpose of solving the above problems to find out that formation of a multi-layer electrodeposition coating film based on difference in a deposition time between electrodeposition coating compositions containing at least two emulsions different in a coating composition deposition starting from each other and difference in the solubility parameter (SP) value between two base resins constituting respective emulsions can impart the layer separation properties to the cationic electrodeposition coating film on heat-curing hot air flow, resulting in completing the present invention.

It is an object of the present invention to provide a multi-layer electrodeposition coating film-forming method capable of forming an electrodeposition coating film showing good properties in weather resistance, corrosion resistance and finished appearance with good the electrodeposition coating composition stability.

That is, the present invention provides:

1. A multi-layer electrodeposition coating film-forming method which comprises subjecting a cationic electrodeposition coating composition containing at least two emulsions to an electrodeposition coating, said cationic electrodeposition coating composition being such that a difference in an electrical quantity (a) required for deposition starting between a first coating composition comprising a first emulsion and a second coating composition comprising a second emulsion in two emulsions selected from the at least two emulsions is in the range of 50 to 400 $C/m^2$.

2. A method as described in paragraph 1, wherein the cationic electrodeposition coating composition contains an emulsion (I) comprising an amino group-containing epoxy resin (A) and a blocked isocyanate curing agent ($C_1$); and an emulsion (II) comprising an amino group-containing acrylic resin (B) and a blocked isocyanate curing agent ($C_2$) same as or different from the curing agent ($C_1$).

3. A method as described in paragraph 1 or 2, wherein a solubility parameter (SP) value of the amino group-containing acrylic resin (B) is higher than a solubility parameter (SP) value of the amino group-containing epoxy resin (A) by 0.3 or more.

4. A method as described in any one of paragraphs 1 to 3, wherein the cationic electrodeposition coating composition contains an ultraviolet light absorber and/or a hindered amine based light stabilizer.

5. A method as described in any one of paragraphs 1 to 4, wherein the cationic electrodeposition coating composition contains a microemulsion prepared by water-dispersing a hydrolyzable alkoxysilyl group and a cationic group-containing acrylic copolymer.

6. A method as described in any one of paragraphs 1 to 5, wherein the electrodeposition coating is carried out by a multi-stage energizing method such that a difference between a coating constant-voltage ($V_1$) of a first stage and a coating constant-voltage ($V_2$) of a second stage in the multi-stage energizing method is 50 V or more, that a time ($t_1$) required for the coating constant-voltage ($V_1$) of the first stage is in the range of 10 to 120 seconds, and that a time ($t_2$) required for the coating constant-voltage ($v_2$) of the second stage is in the range of 60 to 170 seconds.

7. A coating product prepared by the multi-layer electrodeposition coating film-forming method as described in any one of paragraphs 1 to 6.

Figure 4:
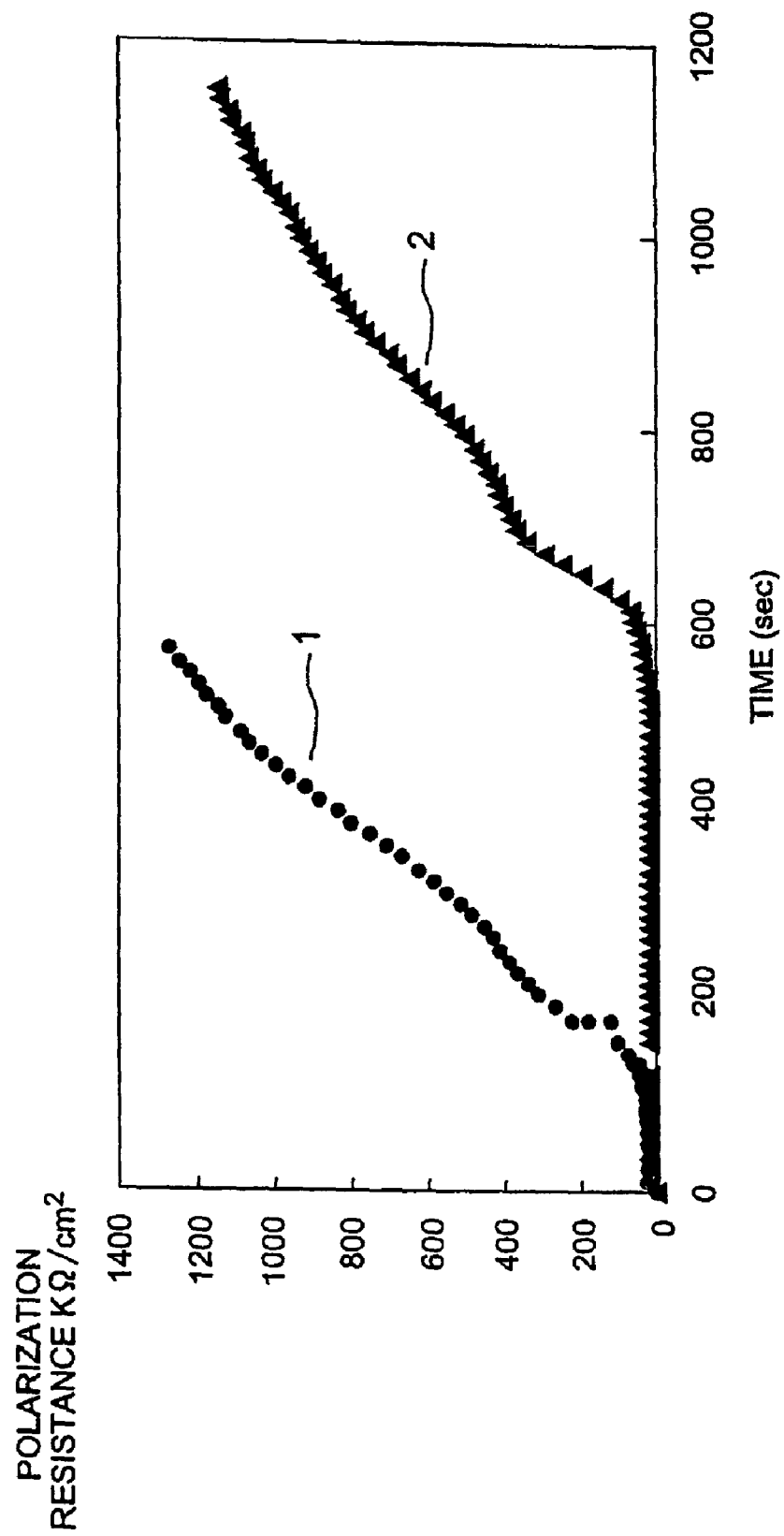
FIG. 4 is a graph showing change with time of polarization resistance from an energizing starting time in the case where the electrodeposition coating was carried out at a constant current density.

The number 1 in FIG. 4 represents a graph of a coating composition deposited earlier.

The number 2 in FIG. 4 represents a graph of a coating composition deposited later.

DETAILED DESCRIPTION OF THE INVENTION

The present invention relates to a multi-layer electrodeposition coating film-forming method which comprises subjecting a cationic electrodeposition coating composition containing at least two emulsions to an electrodeposition coating, said cationic electrodeposition coating composition being such that a difference in an electrical quantity (a) required for deposition starting between a first coating composition comprising a first emulsion and a second coating composition comprising a second emulsion in two emulsions selected from the at least two emulsions is controlled in a specified range so as to form a coating film showing good properties in weather resistance, corrosion resistance and the like.

The electrical quantity (a) required for deposition starting, the emulsion (I) comprising the amino group-containing epoxy resin (A), the emulsion (II) comprising the amino group-containing acrylic resin (B), the curing agent (C) including the curing agents ($C_1$) and ($C_2$), the light stabilizer, the microemulsion prepared by water-dispersing the hydrolyzable alkoxysilyl group and the cationic group-containing acrylic copolymer, and the multi-stage energizing method are described hereinafter.

Electrical Quantity (a) Required for Deposition Starting:

The electrical quantity (a) required for deposition starting is determined from a X intercept value (an electrical quantity X at dry weight Y=0) of the equation (1) obtained by application of a regression analysis to a relationship between an electrical quantity X (coulomb) and a deposited dry weight Y (mg) in a 3-minutes electrodeposition coating under respective voltages, for example, 100 V, 150 V, 200 V, 250 V and 300 V.

Figure 1:
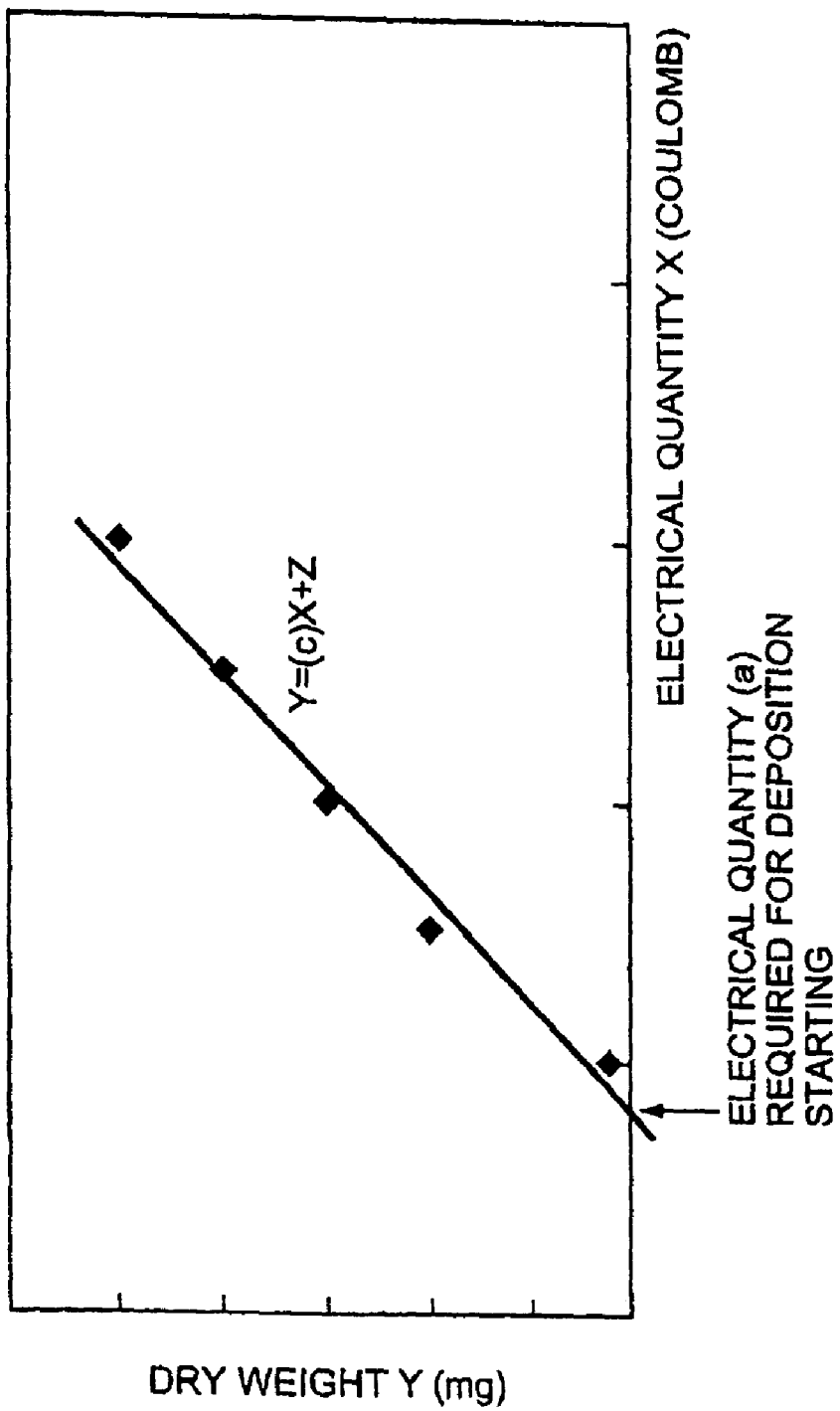
FIG. 1 is a graph showing a relationship between electrical quantity (X) and dry weight (mg).

Equation (1):

$$Y=(c)X+(a) \qquad (1)$$

where (c) represents a coating composition deposition amount per unit of the electrical quantity (see FIG. 1).

The difference between an electrical quantity ($a_1$) required for deposition starting of a first coating composition comprising the emulsion (I) and an electrical quantity ($a_2$) required for deposition starting of a second coating composition comprising the emulsion (II) in two emulsions selected from the at least two emulsions is in the range of 50 to 400 $C/m^2$, resulting in that a coating composition having a lower value of the electrical quantity required for deposition starting firstly start depositing onto the steel plate to form a first layer, thereafter a coating composition having a higher value of the electrical quantity required for deposition starting compared with the former coating composition starts depositing thereonto to form a second layer, resulting in easily forming a multi-layer electrodeposition coating film.

Figure 2:
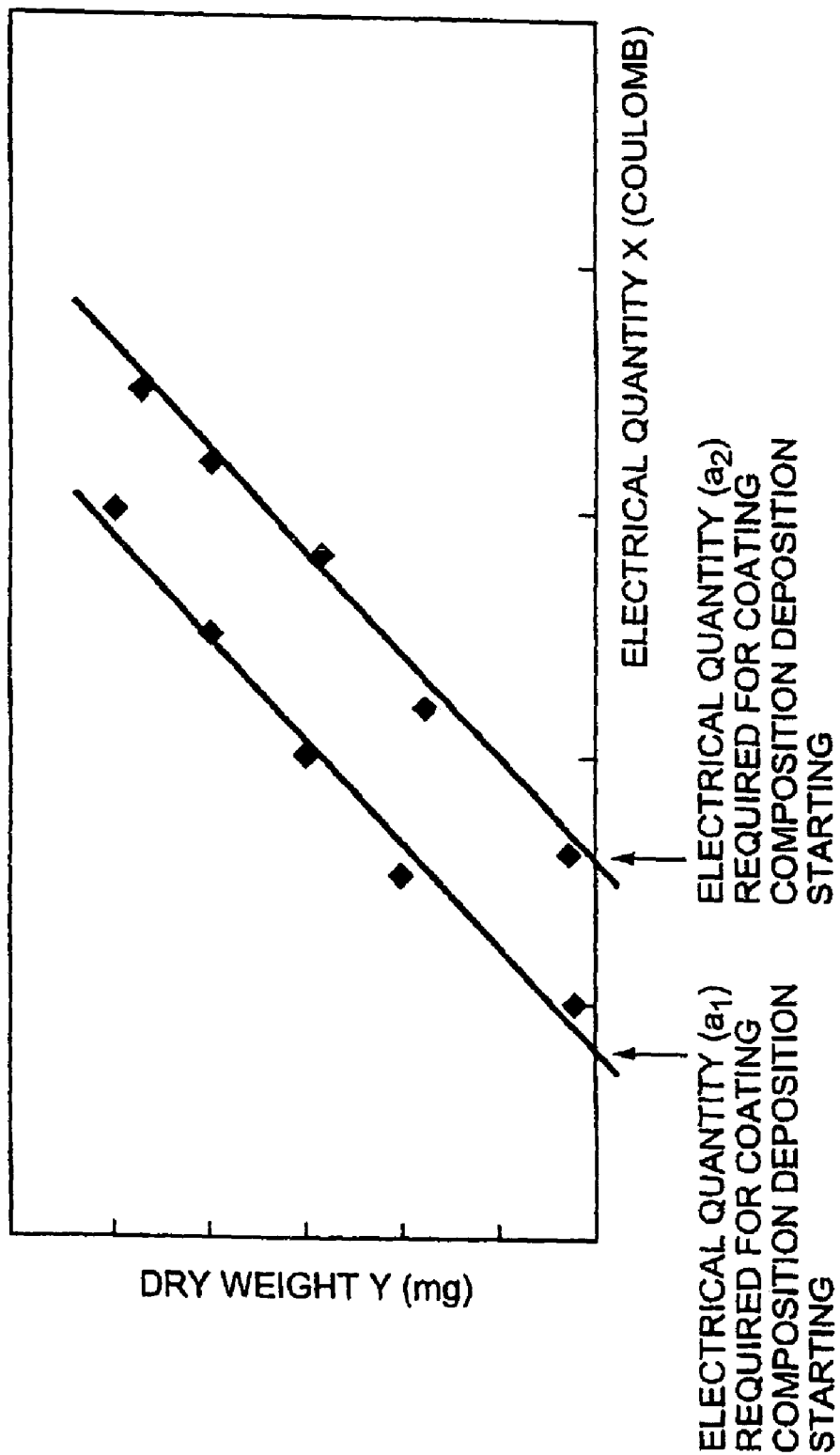
FIG. 2 is a graph showing relationship between electrical quantity (X) and dry weight (mg) in two kinds of coating compositions.
Figure 3:
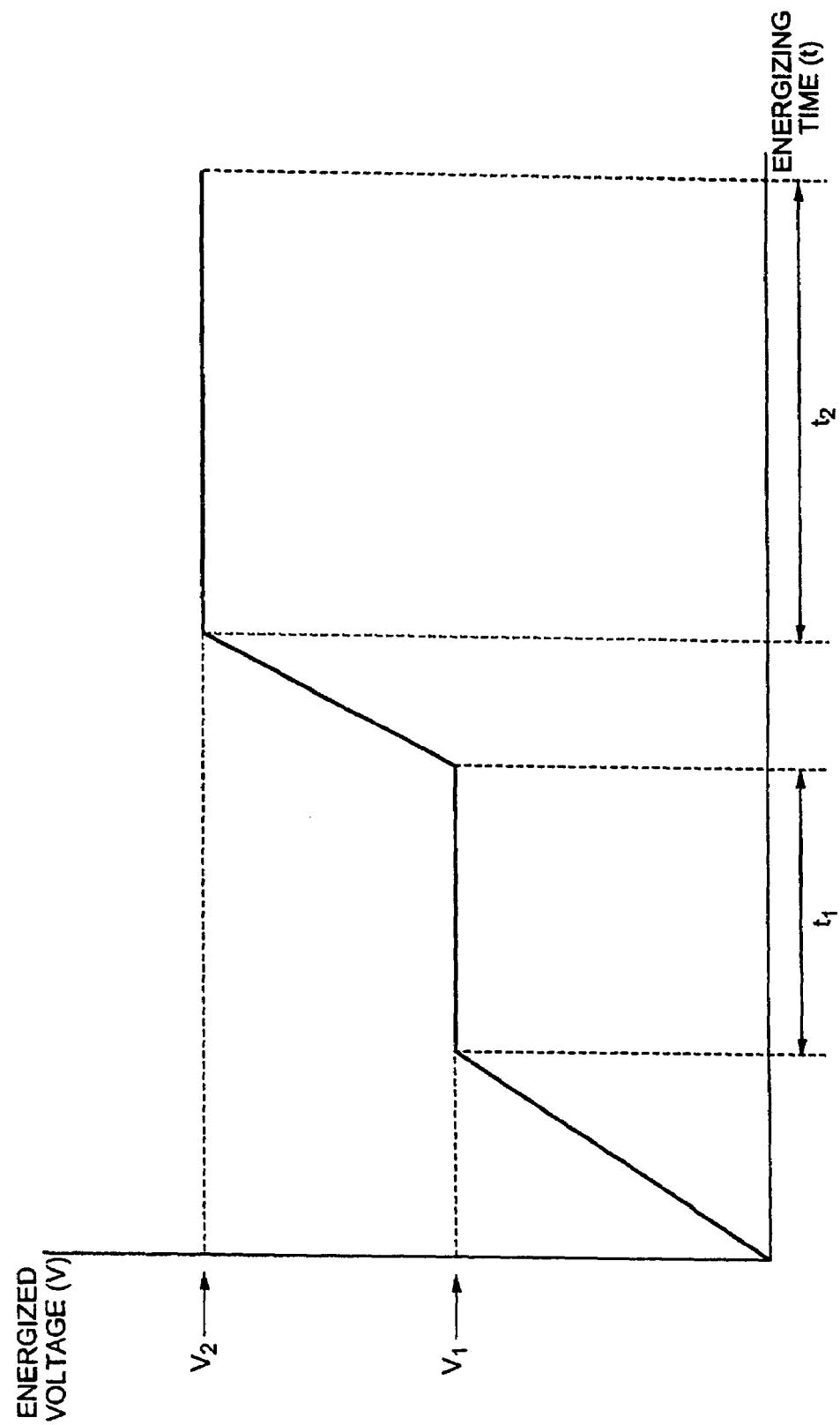
FIG. 3 is a pattern showing voltage change in the two-stage energizing method.

For example, in the case where an electrical quantity ($a_1$) required for deposition starting of a cationic electrodeposition coating composition (1) prepared by diluting an emulsion (I) containing an amine-added epoxy resin showing good corrosion resistance is 300 $C/m^2$, and an electrical quantity ($a_2$) required for deposition starting of a cationic electrodeposition coating composition (2) prepared by diluting an emulsion (II) containing an amine-added acrylic resin showing good corrosion resistance is 450 $C/m^2$, the difference between the electrical quantity ($a_1$) and the electrical quantity ($a_2$) is 150 $C/m^2$, so that a satisfactory multi-layer electrodeposition coating film can be formed (see FIG. 2).

When the difference in the electrical quantity required for deposition starting is more than 400 $C/m^2$, a coating film formation from the emulsion (I) only may primarily take place and deposition of the emulsion (II) may become difficult, showing poor coating composition stability in a prolonged time. On the other hand, in the case where the electrical quantity required for deposition starting is less than 50 $C/m^2$, a satisfactory multi-layer electrodeposition coating film can not be formed.

Cationic Electrodeposition Coating Composition:

The cationic electrodeposition coating composition to obtain a multi-layer electrodeposition coating film showing satisfactory properties in both weather resistance and corrosion resistance and having a prolonged good stability requires a particular coating composition design different from those in the prior art.

That is, an amount of a neutralizing agent for the emulsion (I) constituting the cationic electrodeposition coating composition (1) must be reduced than usual and a water dispersion stability must not be reduced, so that the difference in the electrical quantity (a) required for deposition starting may be in the range of 50 to 400 $C/m^2$. The amount of the neutralizing agent is such that a neutralization value is 8 to 15 mg KOH/g, preferably 10 to 13 mg KOH/g in terms of mg KOH per one gram of total resin solid content.

Selection of a base resin is very important to obtain a stable emulsion in a reduced amount of the neutralizing agent. In the case of the base resin, optimization of a base strength, balance between hydrophilic properties and hydrophobic properties and viscoelasticity by selection of a kind and amount of a suitable amine, and kind of plasticization modifier is necessary. In the case of a curing agent, an optimization of a balance between hydrophilic properties and hydrophobic properties and viscoelasticity by control of a kind and molecular weight of a polyisocyanate and a kind and molecular weight of a blocking agent is necessary.

The polyphenol compound used for obtaining the epoxy resin may include ones known in the art, for example, bis(4-hydroxyphenyl)-2,2-propane (bisphenol A), 4,4-dihydroxybenzophenone, bis(4-hydroxyphenyl)methane (bisphenol F), bis(4-hydroxyphenyl)-1,1-ethane, bis(4-hydroxyphenyl)-1,1-isobutane, bis(4-hydroxy-tert-butyl-phenyl)-2,2-propane, bis(2-hydroxynaphthyl)methane, tetra(4-hydroxyphenyl)-1,1,2,2-ethane, 4,4-dihydroxydiphenylsulfone (bisphenol S), phenol novolak, cresol novolak, and the like.

The epoxy resin obtained by the reaction of the polyphenol compound with epichlorohydrin may particularly include ones derived from bisphenol A and represented by the following formula:

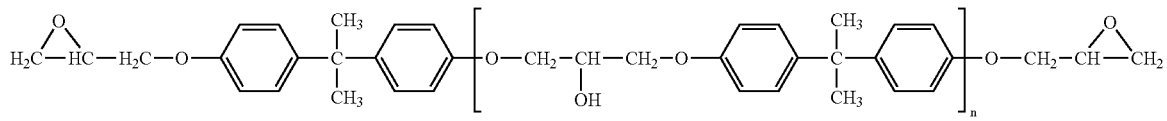

Amino group-containing epoxy resin (A): The amino group-containing epoxy resin is a base resin constituting the emulsion (I) and may include an amine-added epoxy resin prepared by addition of amine from the standpoint of good corrosion resistance.

The epoxy resin may have a number average molecular weight in the range of 1,000 to 10,000, preferably 2,000 to 5,000. When the number average molecular weight is more than 10,000, increase in a resin viscosity may reduce heat flowability on heat-curing, resulting in that the electrodeposition coating film may show poor finished appearance. When less than 1,000, difficulty of control of an amine value by an added amount of the amine may result reduction in emulsion dispersibility.

The above amine compound may include, for example, primary mono- or polyamine, secondary mono- or polyamine, or primary and secondary-mixed polyamine, ketiminized primary amino group-containing secondary mono- or polyamine, ketiminized primary amino group-containing hydroxy compound and the like, specifically diethylamine, diethanolamine, ketiminized product of diethyltriamine, and the like.

The amine-added epoxy resin prepared by addition of an amine compound may preferably include ones containing primary amino-group and having an amine value in the range of 70 mgKOH/g or less, preferably 45 mgKOH/g or less.

The amine-added epoxy resin may be used as it is, but a plasticization-modified epoxy resin may also be used. A plasticization modifier of the epoxy resin may include ones having compatibility with the epoxy resin, and having hydrophobic properties. A modifying may be carried out by reacting with a terminal epoxy group as in the case of the amine compound. A modification amount is required to be a minimum amount necessary for plasticization, preferably is in the range of 5 to 50 parts by weight, preferably 10 to 30 parts by weight per 100 parts by weight of the epoxy resin. Particularly preferable modifying agent may include, for example, xylene formaldehyde resin having reactivity with epoxy group, polycaprolactone and the like.

An epoxy resin (i) as a starting material may particularly include an epoxy resin obtained by a reaction of a polyphenol compound with epichlorohydrin from the standpoints of corrosion resistance of coating film, etc.

where n is 0 to 8.

The epoxy resin (i) has an epoxy equivalent in the range of 180 to 2,500, preferably 200 to 2,000, more preferably 400 to 1,500, and a number average molecular weight in the range of at least 200, particularly 400 to 4,000, more particularly 800 to 2,500.

Examples of commercially available trade names of the epoxy resin may include Epikote 828 EL, Epikote 1002, Epikote 1004 and Epikote 1007 (trade names marketed by Japan Epoxy Resin Co., Ltd.).

The emulsion (II) constituting the cationic electrodeposition coating composition (2) is required to have a larger electrical quantity required for coating composition deposition starting and to retard a coating composition deposition compared with the emulsion (I). Accordingly, an increase of an amount of the neutralizing agent of the emulsion (II) so as to be more than normal and preparation of an emulsion showing good water dispersion stability are important. In the case of the base resin, means therefor may include a means to optimize a balance between hydrophilic properties and hydrophobic properties, and the like. In the case of the curing agent, the above subject matter may be achieved by optimization of a balance between hydrophilic properties and hydrophobic properties by control of kind and amount of polyisocyanate, kind and molecular weight of the blocking agent, and by control of viscoelasticity. The amount of the neutralizing agent is such that a neutralization value is 10 to 30 mgKOH/g, preferably 12 to 20 mgKOH/g in terms of mgKOH per one gram of a total resin solid content.

As the result, a predetermined value of the electrical quantity $(a_2)$ required for deposition starting of the coating composition comprising the emulsion (II) can be obtained, so that difference thereof from the electrical quantity $(a_1)$ required for deposition starting of the coating composition comprising the emulsion (I) may be in the range of 50 to 400 $C/m^2$.

Amino group-containing acrylic resin (B): The amino group-containing acrylic resin (B) is a base resin constituting the emulsion (II) and may usually include an amine-added acrylic resin prepared by addition to an acrylic resin, from the standpoint of good weather resistance.

The acrylic resin may be prepared by subjecting a monomer mixture of a hydroxyl group-containing acrylic monomer, amino group-containing acrylic monomer, aromatic vinyl monomer and optionally other monomer to a radical copolymerization reaction.

The hydroxyl group-containing acrylic monomer may include, for example, 2-hydroxyethyl (meth)acrylate, 2-hydroxypropyl (meth)acrylate, 4-hydroxybutyl (meth)acrylate, adducts of 2-hydroxyethyl (meth)acrylate with caprolactane, for example Placcel FA-2, Placcel FM-3 and the like, and the like. These may be used alone or in combination.

The amino group-containing acrylic monomer may include, for example, N,N-dimethylaminoethyl (meth)acrylate, N,N-diethylaminoethyl (meth)acrylate, N,N-dimethylaminopropyl (meth)acrylate, N,N-di-t-butylaminoethyl (meth)acrylate, N,N-dimethylaminopropyl (meth)acrylate and the like. The aromatic vinyl monomer may include, for example, styrene, vinyl toluene, α-methylstyrene and the like. In addition to the amino group-containing acrylic monomer, one obtained by addition of a terminal active hydrogen-containing amine compound prepared by subjecting glycidyl (meth)acrylate to a ring-opening copolymerization may also be used.

The other monomer may include, for example, methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, cyclohexyl (meth)acrylate, 2-ethylhexyl (meth)acrylate, and the like.

The amine compound as a water dispersion group may include, for example, primary mono- or polyamine, secondary mono- or polyamine, primary and secondary mixed polyamine, ketiminized primary amino group-containing secondary mono- or polyamine, ketiminized primary amino group-containing hydroxy compound and the like, specifically diethylamine, diethanolamine, ketiminized product of diethyltriamine.

The acrylic resin may be obtained by subjecting the above monomers to a radical copolymerization reaction according to the conventionally known method.

The acrylic resin may have a hydroxy value in the range of 10 to 300 mgKOH/g, preferably 50 to 200 mgKOH/g, and a number average molecular weight in the range of 2,000 to 100,000, preferably 3,000 to 50,000.

The amino group-containing epoxy resin (A) has a solubility parameter (SP) value (Note) higher than that of the amino group-containing acrylic resin by 0.3 or more, preferably 0.5 or more from the standpoint of formation of the multi-layer electrodeposition coating film. (Note) SP value: The SP value is an abbreviation of solubility parameter value, and is a measure of an intermolecular interaction of liquid molecules.

The SP value of the resin may be determined by a turbidity point titration, specifically may be calculated according to the following formula by K. W. SUH, J. M. Corbett (Journal of Applied Polymer Science, 12, 2359, 1968):

$$\frac{\sqrt{V_H} * \delta_H + \sqrt{V_D} * \delta_D}{\sqrt{V_H} + \sqrt{V_D}}$$

where $V_H$ is a volume fraction of n-hexane, $V_D$ is a volume fraction of deionized water, $\delta_H$ is a SP value of n-hexane, and $\delta_D$ is a SP value of deionized water.

The above turbidity point titration is such that 0.5 g of a dried resin composition as a solid content is dissolved in 10 ml of acetone, followed by adding n-hexane thereinto to read a titrated amount H (ml) of n-hexane at a turbidity point. Similarly, deionized water is added into an acetone solution of the resin composition to read a titrated amount D (ml) of the deionized water. From the above titrated amounts H (ml) and D (ml), $V_H$, $V_D$, $\delta_H$ and $\delta_D$ in the above equation are determined according to the following equations:

$$V_H = H/(10+H)$$

$$V_D = D/(10+D)$$

$$\delta_H = 9.75 \times 10/(10+H) + 7.24 \times H/(10+H)$$

$$\delta_D = 9.75 \times 10/(10+D) + 23.43 \times D/(10+D)$$

Respective solubility parameters of respective solvents are as follows: acetone: 9.75, n-hexane: 7.24, deionized water: 23.43.

Control of the SP value may easily be carried out depending on composition and proportion of monomers.

Blocked Isocyanate Curing Agent (C)

The blocked isocyanate curing agents used in the emulsion (I) and emulsion (II) are the same as or different from each other, but the curing agent ($C_1$) of emulsion (I) needing corrosion resistance may preferably include an aromatic polyisocyanate, and the curing agent ($C_2$) of emulsion (II) needing weather resistance may preferably include an aliphatic polyisocyanate and alicyclic polyisocyanate.

The aromatic polyisocyanate may include, for example, 1,3- or 1,4-phenylene diisocyanate, 2,4- or 2,6-tolylene diisocyanate (TDI), crude TDI, 2,4'- or 4,4'-diphenylmethane diisocyanate (MDI), 4,4'-diisocyanatobiphenyl, 3,3'-dimethyl-4,4'-diisocyanatobisphenyl, 3,3'-dimethyl-4, 4'-diisocyanatodiphenylmethane, crude MDI, 1,5-naphthylene diisocyanate, 4,4',4"-triphenylmethane, triisocyanate, m- or p-isocyanatophenylsulfonyl isocyanate and the like.

The aliphatic polyisocyanate may include, for example, ethylene diisocyanate, tetramethylene diisocyanate, hexamethylene diisocyanate (HDI), dodecamethylene diisocyanate, 1,6,11-undecane triisocyanate, 2,2,4-trimethylhexamethylene diisocyanate, lysine diisocyanate, 2,6-diisocyanatomethylcaproate, bis(2-isocyanatoethyl) fumarate, bis(2-isocyanatoethyl) carbonate, 2-isocyanatoethyl-2,6-diisocyanatohexanoate and the like, and may also include p-xylylene diisocyanate (XDI), α,α,α',α'-tetramethylxylylene diisocyanate (TMXDI) and the like.

The alicyclic polyisocyanate may include, for example, isophorone diisocyanate (IPDI), dicyclohexylmethane-4,4'-diisocyanate (hydrogenated MDI), cyclohexylene diisocyanate and the like.

The blocking agent is such that addition of the blocking agent to an isocyanate group in the polyisocyanate compound blocks the isocyanate group, and a resulting blocked polyisocyanate compound is stable at normal temperatures, but heating at a temperature in the range of about 100° C. to 200° C. may dissociate the blocking agent to regenerate the isocyanate group.

The blocking agent is also such that addition of the blocking agent to an isocyanate group in the polyisocyanate compound blocks the isocyanate group, and a resulting blocked polyisocyanate compound is stable at normal temperatures, but heating at a heat-curing temperature usually in the range of about 100° C. to 200° C. may dissociate the blocking agent to regenerate a face isocyanate group.

The blocking agent to satisfy the above requirements may include, for example, a lactam based compound such as ε-caprolactam, γ-butylolactam and the like; an oxime compound such as methylethylketoxime, cyclohexanoneoxime and the like; phenol based compound such as phenol, p-t-butylphenol, cresol and the like; aliphatic alcohols such as n-butanol, 2-ethylhexanol and the like; aromatic alkyl alcohols such as phenyl carbitol, methylphenyl carbitol and the like; ether alcohol compounds such as ethylene glycol monobutyl ether, ethylene glycol monoethyl ether and the like; secondary, tertiary hydroxyl group-containing alcohol compounds such as propylene glycol, dipropylene glycol, 1,3-butanediol, 1,2-butanediol, 3-methyl-1,2-butanediol, 1,2-pentanediol, 1,4-pentanediol, 3-methyl-4,3-pentanediol, 3-methyl-4,5-pentanediol, 2,2,4-trimethyl-1,3-pentanediol, 1,5-hexanediol, 1,4-hexanediol, 2,2-dimethylol propionic acid, 2,2-dimethylol butanoic acid, dimethylol valeric acid, glyceric acid and the like.

Of these, a particularly preferable blocked polyisocyanate may include methylethylketoxime-blocked isophorone diisocyanate, hexamethylene diisocyanate triisocyanurate and the like. The carboxylic acid used in the neutralization of the amine-added epoxy resin and the amine-added acrylic resin may preferably include acetic acid, formic acid, and mixtures thereof, use of which may result a coating composition showing improved properties in uniform coating properties, anti-corrosive properties, finished appearance, coating composition stability.

The cationic electrodeposition coating composition of the present invention comprises at least two emulsions including the emulsion (I) and the emulsion (II). A mixing ratio of the emulsion (I) to the emulsion (II) may vary depending on coating film performances, but preferably may be in the range of 20:80 to 80:20.

The cationic electrodeposition coating composition of the present invention may contain in place of the above emulsion a third emulsion, for example, polyurethane emulsion, polyester emulsion, and the like.

The polyurethane emulsion may include, for example, ones obtained by subjecting a mixture of a polyisocyanate compound, polyols and a tertiary amino group-containing diol to an urethanization reaction at an equivalent ratio in an excess amount of hydroxyl group according to a one shot process or multi-stage process.

The polyisocyanate compound may include a compound having at least two isocyanate groups in one molecule, for example, aliphatic diisocyanate such as hexamethylene diisocyanate, trimethylhexane diisocyanate, lysine diisocyanate and the like; alicyclic diisocyanate such as cyclohexane diisocyanate, isophorone diisocyanate, dicyclohexylmethane diisocyanate, methylcyclohexylene diisocyanate and the like, and the like.

The polyols is a compound having at least two hydroxyl groups in one molecule, and may include, for example, polyether diol obtained by subjecting an alkylene oxide such as ethylene oxide, propylene oxide, butylene oxide and the like, and/or, a heterocyclic ether such as tetrahydrofuran polymerization or copolymerization (block or random), for example, polyethylene glycol, polypropylene glycol, polyethylene-propylene (block or random) glycol, polytetramethylene ether glycol, polyhexamethylene ether glycol, polyoctamethylene ether glycol and the like; polyester diol obtained by subjecting a mixture of dicarboxylic acid such as adipic acid, succinic acid, sebacic acid, glutaric acid, maleic acid, fumaric acid, phthalic acid and the like, and glycol such as ethylene glycol, propylene glycol, butanediol, hexanediol, neopentyl glycol, bishydroxymethylcyclohexane and the like to a condensation polymerization, for example, polyethylene adipate, polybutylene adipate, polyhexamethylene adipate, polyneopentyl adipate, polyethylene-butylene adipate, polyneopentylhexyl adipate and the like; polylactone diol, for example, polycaprolactone diol, poly 3-methylvalerolactone diol and the like; polycarbonate diol; mixtures thereof and the like. The polyols have a number average molecular weight in the range of 500 or more, preferably 500 to 5000, more preferably 1000 to 3000.

The polyols may also include a low molecular weight polyol having at least two hydroxyl groups in one molecule and a number average molecular weight less than 500, more specifically glycol as the starting material of the polyester dial and alkylene oxide low molar adduct (molecular weight less than 500) thereof; trivalent alcohol such as glycerin, trimethylolethane, trimethylolpropane and the like, and alkylene oxide low molar adduct (molecular weight less than 500) thereof; and mixtures thereof.

In the case where a mixture of the polyols having the number average molecular weight of 500 or more and a low molecular weight polyols having a number average molecular weight less than 500 is used, a mixing ratio thereof is such that the former is in the range of 80 to 99.9% by weight, particularly 90 to 99.5% by weight, and the latter is in the range of 20 to 0.1% by weight, particularly 10 to 0.5% by weight based on a total weight of both polyols.

An amount of the tertiary amino group-containing diol is such that an amount of nitrogen atom derived from the tertiary amino group is in the range of 0.1 to 5% by weight, preferably 0.2 to 2% by weight based on the weight of the polyurethane resin. When less than 0.1% by weight, a stable dispersion for the cationic electrodeposition may be difficult to be obtained. When more than 5% by weight, a high hydrophilic properties of the polymer may result a coating film showing poor water resistance.

The urethanization reaction of the mixture of the polyisocyanate compound, polyols and tertiary amino group-containing diol may be carried out by a method known per se in the art. The resulting polyurethane resin preferably has a number average molecular weight in the range of 1000 to 50000, particularly 2000 to 20000, an amine value in the range of 10 to 200 mgKOH/g, particularly 20 to 100 mgKOH/g, and a hydroxy value in the range of 30 to 300 mgKOH/g, particularly 50 to 200 mgKOH/g.

The polyester emulsion may be obtained by reacting an amine with an epoxy group-terminating polyester resin prepared by addition of epichlorohydrin to a polyester resin synthesized from a polybasic acid and a polyhydric alcohol, or with an epoxy group-terminating polyester resin synthesized by an esterification reaction between a polyepoxide and polybasic acid to introduce a cationic group, followed by neutralizing, and water-dispersing.

The polybasic acid used in the synthesis of the polyester resin is a compound having at least two carboxyl groups in one molecule, and may include, for example, aromatic dicarboxylic acid such as terephthalic acid, isophthalic acid, phthalic acid, naphthalene dicarboxylic acid, biphenyl dicarboxylic acid, diphenylmethane dicarboxylic acid and the like, anhydrides thereof; aliphatic dicarboxylic acid such as hexahydroisophthalic acid, hexahydroterephthalic acid, hexahydrophthalic acid, tetrahydrophthalic acid and the like, anhydrides thereof; aliphatic dicarboxylic acid such as adipic acid, sebacic acid, suberic acid, succinic acid, glutaric acid, maleic acid, chloromaleic acid, fumaric acid, dodecane diacid, pimelic acid, azelaic acid, itaconic acid, citraconic acid, dimer acid and the like, anhydrides thereof; lower alkyl esters thereof; trivalent or higher polybasic acid such as trimellitic acid, trimellitic anhydride, pyromellitic acid, trimesic acid and anhydrides thereof, and the like.

The polyhydric alcohol used in the synthesis of the polyester resin may include a compound having at least two hydroxyl groups in one molecule, specifically, for example, dihydric alcohol such as ethylene glycol, propylene glycol, diethylene glycol, trimethylene glycol, tetraethylene glycol, triethylene glycol, dipropylene glycol, butane diol, pentane diol, dimethyltrimethylene glycol, tetramethylene glycol, hexane diol, neopentyl glycol and the like; polylactone diol prepared by addition of the lactones such as ε-caprolactone and the like to the dihydric alcohol; ester diols such as bis(hydroxyethyl) terephthalate and the like; polyether diols such as alkylene oxide adduct of bisphenol A, polyethylene glycol, polypropylene glycol, polybutylene glycol and the like; monoepoxy compound such as α-olefin epoxide such as propylene oxide and butylene oxide and the like, Cardura E10 (trade name, marketed by Shell Japan Ltd., glycidyl ester of synthetic high molecular saturated fatty acid) and the like; trihydric or higher alcohol such as glycerin, trimethylol propane, trimethylol ethane, hexane triol, pentaerythritol, dipentaerythritol, sorbitol, mannitol and the like; polylactone polyols prepared by addition of lactones such as ε-caprolactone and the like to the trihydric or higher alcohol; aliphatic polyhydric alcohol such as 1,4-cyclohexanedimethanol, tricyclodecanedimethanol, hydrogenated bisphenol F, hydrogenated bisphenol A and the like; and the like.

The polyepoxide used in the synthesis of the polyester resin may include diglycidyl ether such as tetramethylene glycol, pentanediol, hexanediol, hydrogenated bisphenol A, hydrogenated bisphenol F and the like.

A synthesizing method of the cationic polyurethane resin and polyester resin may include, for example, a method which comprises reacting N-methyldiethanolamine with a partial adduct of diisocyanate to introduce a tertiary amino group, and a method which comprises reacting a ketimine-blocked primary amino group-containing secondary amine such as diethylenetriaminemethylisobutylketimine onto an isocyanate terminal, followed by subjecting a ketimine-blocked moiety to hydrolysis during a water dispersion step of the resin to introduce a primary amino group.

The use of the polyurethane emulsion or the polyester emulsion in place of the acrylic resin emulsion in the cationic electrodeposition coating composition or as a third emulsion makes it possible to improve an interlayer adhesion properties to a topcoat coating composition and antichipping properties.

The cationic electrodeposition coating composition may contain any pigments used for the cationic electrodeposition coating composition in the art without particular limitations, for example, color pigment such as titanium oxide, carbon black, red iron and the like; extender pigments such as clay, mica barium sulfate, calcium carbonate, silica and the like; anti-corrosive pigment such as aluminum phosphomolybdate, aluminum tripolyphosphate and the like, and may contain a bismuth compound for the purpose of corrosion control and anti-corrosion, for example, bismuth oxide, bismuth hydroxide, basic bismuth carbonate, bismuth nitrate, bismuth silicate and the like.

A mixing amount of the pigments is in the range of 1 to 100 parts by weight, preferably 10 to 50 parts by weight per 100 parts by weight of a total solid content of the base resin and curing agent.

The cationic electrodeposition coating composition may optionally contain an ultraviolet light absorber, light stabilizer, a microemulsion prepared by water-dispersing an acrylic copolymer containing a hydrolizable alkoxysilyl group and cationic group, a curing catalyst and the like.

The ultraviolet light absorber may include ones known in the art, for example, benzotriazole series such as 2-(2'-hydroxy-5'-methylphenyl) benzotriazole, 2-(2'-hydroxy-5'-t-butylphenyl) benzotriazole, 2-(2'-hydroxy-3'-t-butyl-5'-methylphenyl)-5-chlorobenzotriazole, 2-(2'-hydroxy-3',5'-di-t-butylphenyl)-5-chlorobenzotriazole, 2-(2'-hydroxy-hydroxy-3',5'-di-t-amylphenyl) benzotriazole, 2-(2'-hydroxy-4'-octoxyphenyl) benzotriazole, 2-{2'-hydroxy-3'-(3",4",5",6"-tetrahydrophthalimidemethyl)-5'-methylphenyl}benzotriazole and the like; triazine series such as 2,4-bis(2,4-dimethylphenyl)-6-(2-hydroxy-4-isooctyloxyphenyl)-1,3,5-triazine, 2-[4((2-hydroxy-3-dodecyloxypropyl)-oxy]-2-hydroxyphenyl)-4,6-bis(2,4-dimethylphenyl)-1,3,5-triazine, 2-[4-((2-hydroxy-3-tridecyloxypropyl)-oxy)-2-hydroxyphenyl)-4,6-bis(2,4-dimethylphenyl)-1,3,5-triazine, 2-(2,4-dihydroxyphenyl)-4,6-bis(2,4-dimethylphenyl)-1,3,5-triazine and the like; salicylic acid derivatives such as phenyl salicylate, p-octylphenyl salicylate, 4-tert-butylphenyl salicylate and the like; benzophenone series such as 4-dihydroxybenzophenone, 2-hydroxy-4-methoxybenzophenone, 2,2'-dihydroxy-4-methoxybenzophenone, 2-hydroxy-4-methoxy-2'-carboxybenzophenone, 2-hydroxy-4-methoxy-5-sulfobenzophenone trihydrate, 2,2'-dihydroxy-4,4'-dimethoxybenzophenone, 2-hydroxy-4-octoxybenzophenone, 2-hydroxy-4-octadecyloxybenzophenone, sodium 2,2'-dihydroxy-4,4'-dimethoxy-5-sulfobenzophenone, 2,2',4,4'-tetrahydroxybenzophenone, 4-dodecyloxy-2-hydroxybenzophenone, 5-chloro-2-hydroxybenzophenone, resorcinol monobenzoate, 2,4-benzoyl resorcinol, 4,6-dibenzoyl resorcinol, hydroxydodecylbenzophenone, 2,2'-dihydroxy-4(3-methacryloxy-2-hydroxypropoxy)benzophenone and the like.

The light stabilizer may include a hindered amine based light stabilizer (HALS), preferably hindered piperidines showing good light stabilizing function, for example, bis(2,2,6,6-tetramethyl-4-piperidinyl)sebacate, bis(N-methyl-2,2,6,6-tetramethyl-4-piperidinyl)sebacate, 4-benzoyloxy-2,2,6,6-tetramethyl piperidine, as an oligomer type HALS, poly[[6-(1,1,3,3-tetramethylbutyl)imino-1,3,5-triazine-2,4-diyl] [(2,2,6,6-tetramethyl-4-piperidil)imino]hexamethylene [(2,2,6,6-tetramethyl-4-piperidil)iminol]] (trade name, marketed by Ciba-Geigy (Japan) Ltd., Chimassorb 944LD), HALS containing, as a main component, polyester linkage based linkage of 4-hydroxy-2,2,6,6-tetramethyl-1-piperidine ethanol and succinic acid (Tinuvin 622LD, trade name, marketed by Ciba-Geigy (Japan) Ltd.), and the like, but not to be limited thereto.

The cationic electrodeposition coating composition may optionally contain an ultraviolet light absorber which absorbs the ultraviolet light to convert an absorbed photoenergy into a harmless form such as heat energy, resulting in prevent a coating film from being degraded.

The cationic electrodeposition coating composition may also contain the microemulsion prepared by water dispersing an acrylic copolymer having a hydrolizable alkoxysilyl group and a cationic group in place of the acrylic resin emulsion in the cationic electrodeposition coating composition, or as a third emulsion so as to improve finished properties and weather resistance.

The curing catalyst is effective to promote a crosslinking reaction between the base resin and the curing agent, and may include, for example, dioctyltin oxide, dibutyltin oxide, tin octoate, dibutyltin dilaurate, dibutyltin dibenzoate, zinc octylate, zinc formate and the like. A mixing amount of the curing catalyst is in the range of 0.1 to 10 parts by weight per 100 parts by weight of a total amount of the base resin and the curing agent.

The cationic electrodeposition coating composition may preferably be obtained by mixing the pigment paste prepared beforehand with a mixture of at least two emulsions obtained by dispersing the base resin and the curing agent.

Multi-Stage Energizing Method

The electrodeposition coating by use of the electrodeposition coating composition for use in the automobile body and automobile parts. Production line may be carried out by the multi-stage energizing method for the purpose of improving the coating properties and finished properties of an anti-corrosive steel plate.

The multi-stage energizing method is such that a difference between a coating constant-voltage ($V_1$) of a first stage and a coating constant-voltage ($V_2$) of a second stage in the multi-stage energizing method is 50 V or more, that a time ($t_1$) required for the coating constant-voltage ($V_1$) of the first stage is in the range of 10 to 120 seconds, and that a time ($t_2$) required for the coating constant-voltage ($V_2$) of the second stage is in the range of 60 to 170 seconds, resulting in that the emulsion (I) primarily deposit close to the surface of the steel plate, and the emulsion (II) may primarily deposit close to the surface of the electrodeposition coating film.

A coating composition deposition starting time may be determined by such a method that the emulsion (I) and emulsion (II) are diluted separately from each other to obtain respective cationic electrodeposition coating compositions, followed by coating respectively at a constant current density, for example, 0.3 mA/cm$^2$, 0.4 mA/cm$^2$, and 0.5 mA/cm$^2$, and determining an elapsed time from an energizing starting time to a time when a voltage starts increasing and a polarization resistance starts increasing.

The multi-layer electrodeposition coating film-forming method of the present invention provides the following particular effects:

1. A cationic electrodeposition coating film showing good properties in weather resistance, corrosion resistance and finished properties can be obtained.
2. In a 3 coat coating-coating films comprising an electrodeposition coating film, intercoat coating film and topcoat coating film, the intercoat coating step can be eliminated as described in the above paragraph 1, resulting in making possible energy saving and coating step saving.
3. In the case of coating on a metal part material, for example, a door part, fender part, outer plate, inner plate of the automobile body, a separated multi-layer coating film comprising an epoxy resin lower layer and an acrylic resin upper layer can be formed on the outer plate where a current density is easily controlled, while a coating film primarily comprising epoxy resin showing good corrosion resistance can be obtained on the inner plate where a coating film is thin because a low current density only is available.
4. Even in the case where the coating composition is subjected to a prolonged shears or loads, good coating composition stability and formation of a coating film showing good finished properties are made possible.
5. The multi-layer electrodeposition coating film-forming method makes it possible to effectively form a multi-layer electrodeposition coating film showing good properties in both weather resistance and corrosion resistance by use of the multi-stage energizing method.

For the purpose of obtaining the multi-layer electrodeposition coating film capable of providing the above effects, control of a neutralizing agent amount of respective emulsions (I) and (II) and a preparation of a stable emulsion without reducing a water dispersion stability are necessary, so that the difference in the electrical quantity required for deposition starting between cationic electrodeposition coating compositions as above described may be in a specified range.

EXAMPLE

The present invention is explained more in detail by the following Examples, in which "part" and "%" represent "part by weight" and "% by weight" respectively, and is not to be limited thereto.

Preparation Example 1

(Preparation Example of Amino Group-Containing Epoxy Resin No. 1)

A mixture of 1010 g of Epikote 828EL (trade name, marketed by Japan Epoxy Resin Co., Ltd., epoxy resin), 390 g of bisphenol A and 0.2 g of dimethylbenzylamine was reacted at 130° C. so as to an epoxy equivalent of 800, followed by adding 160 g of diethanolamine and 65 g of a ketiminized product of diethylenetriamine, reacting at 120° C. for 4 hours, adding butylcellosolve to obtain an amino group-containing epoxy resin having an amine value of 43 mgKOH/g, a number average molecular weight of 2,000 and a solid content of 75% as the amino group-containing epoxy resin No. 1 having a SP value of 10.9.

Preparation Example 2

(Preparation Example of Amino Group-Containing Acrylic Resin No. 1)

A 2 λ four-necked flask was charged with 246 parts of propylene glycol monomethyl ether, followed by introducing nitrogen gas, keeping at 110° C., dropping the following mixture over 3 hours,

| | |
|---|---|
| styrene | 30 parts |
| methyl methacrylate | 6 parts |
| n-butyl acrylate | 6 parts |
| 2-ethylhexyl methacrylate | 24 parts |
| Placcel FM-3 (trade name, by Daicel Chemical Industries, Ltd.) | 24 parts |
| dimethylaminoethyl methacrylate | 10 parts | one hour after the completion of dropping, dropping over one hour a solution prepared by dissolving 8 parts of 2,2'-azobis(2-methylbutylonitrile) into 56 parts of propylene glycol monomethyl ether, keeping at 110° C. for one hour, and adding methylisobutylketone to obtain an amino group-containing acrylic resin No. 1 having a hydroxy value of 80 mgKOH/g, an amine value of 35 mgKOH/g, a number average molecular weight of 16000 and a solid content of 75%.

Preparation Example 3

(Preparation Example of Amino Group-Containing Acrylic Resin No. 2)

Preparation Example 2 was duplicated except that dropping mixtures as formulated in Table 1 were used to obtain an amino group-containing acrylic resin No. 2.

Preparation Example 4

(Preparation Example of Amino Group-Containing Acrylic Resin No. 3)

Preparation Example 2 was duplicated except that dropping mixtures as formulated in Table 1 were used to obtain an amino group-containing acrylic resin No. 3.

Preparation Example 5

(Preparation Example of Amino Group-Containing Acrylic Resin No. 4)

Preparation Example 2 was duplicated except that dropping mixtures as formulated in Table 1 were used to obtain an amino group-containing acrylic resin No. 4.

TABLE 1

| | Preparation Example | | | |
|---|---|---|---|---|
| | 2 | 3 | 4 | 5 |
| Amino group-containing acrylic resin | No. 1 | No. 2 | No. 3 | No. 4 |
| Styrene | 30 | 8 | 30 | 10 |
| Methyl methacrylate | 6 | 0 | 10 | 0 |
| n-butyl acrylate | 6 | 8 | 26 | 10 |
| Iso-butyl methacrylate | 0 | 30 | 0 | 23 |
| 2-ethylhexyl methacrylate | 24 | 20 | 0 | 20 |
| Hydroxyethyl methacrylate | 0 | 25 | 25 | 25 |
| Placcel FM3 | 24 | 0 | 0 | 0 |
| Dimethylaminoethyl methacrylate | 10 | 0 | 0 | 0 |
| Glycidyl methacrylate | 0 | 9 | 9 | 12 |
| Diethylamine | 0 | 2 | 2 | 2 |
| Solid content (%) | 75 | 75 | 75 | 75 |
| Hydroxy value mgKOH/g | 130 | 100 | 100 | 100 |
| Amine value mgKOH/g | 35 | 30 | 30 | 40 |
| Number average molecular weight | 16000 | 16000 | 16000 | 16000 |
| SP value | 10.0 | 10.1 | 11.0 | 9.8 |

Preparation Example 6

(Preparation Example of Curing Agent No. 1)

A reactor was charged with 270 parts of Cosmonate M-200 (trade name, marketed by Mitsui Chemicals, Inc., crude MDI) and 25 parts of methylisobutylketone, followed by heating up to 70° C., slowly adding 15 parts of 2-dimethylolbutanoic acid, dropping 118 parts of ethylene glycol monobutyl ether, reacting at 70° C. for one hour, cooling down to 60° C., adding 152 parts of propylene glycol, sampling with time while keeping at that temperature, and confirming that an unreacted isocyanato group absorption disappeared by an infrared absorption spectrometer measurement to obtain a curing agent No. 1 having a solid content of 80%.

Preparation Example 7

(Preparation Example of Curing Agent No. 2)

Dropping of 50 parts of isophorone diisocyanate (IPDI) into 40 parts of methylketoxime at 40 to 60° C. was followed by heating at 80° C. for one hour to obtain a curing agent No. 2 having a solid content of 90% and used in a cationic electrodeposition coating composition.

Preparation Example 8

(Preparation Example of Microemulsion)

One liter flask equipped with a stirring device, thermometer, cooling tube and heating mantle was charged with 320 parts of isopropyl alcohol, followed by heating up to a reflux temperature (about 83° C.) with agitation, dropping a mixture of the following monomers and polymerization initiator at reflux temperature (about 83 to 87° C.) over about 2 hours,

| styrene | 272 parts |
|---|---|
| n-butyl acrylate | 244 parts |
| 2-hydroxyethyl acrylate | 100 parts |
| dimethylaminoethyl methacrylate | 144 parts |
| KBM-503* | 20 parts |
| azobisisobutylonitrile | 24 parts | followed by stirring for 30 minutes, dropping a solution prepared by dissolving 8 parts of azobisdimethylovaleronitrile into 120 parts of isopropyl alcohol over about one hour, stirring for about one hour, introducing 320 parts of isopropyl alcohol for coating to obtain an acrylic copolymer varnish having a solid content of 51%, as amine value of 64, hydroxt value of 48 and a number average molecular weight of about 20000.

Thereafter, a mixture of 780 parts of the acrylic copolymer varnish and 6.4 parts of acetic acid was stirred at about 30° C. for 3 minutes, followed by dropping 1156 parts of deionized water over about 30 minutes while stirring strongly, heating up to 75 to 80° C., and stirring for about 3 hours to obtain a microemulsion.

Preparation Example 9

(Preparation Example of Pigment Paste No. 1)

A mixture of 833 parts (5 parts as solid content) of a 60% solid content quaternary ammonium salt type epoxy resin based dispersing resin, 27.8 parts of deionized water, 20 parts of titanium white, 0.1 part of carbon black, 3 parts of purified clay, 2 parts of bismuth hydroxide and one part of organotin was dispersed in a ball mill for 20 hours to obtain a 50% solid content pigment paste No. 1.

Preparation Example 10

(Preparation Example of Pigment Paste No. 2)

The pigment paste No. 2 was prepared according to the formulation shown in Table 2 in the same manner as in the pigment paste No. 1.

TABLE 2

| | | Preparation Examples | |
|---|---|---|---|
| | | 9 | 10 |
| | | No. 1 | No. 2 |
| 60% quaternary ammonium salt type epoxy resin based dispersing resin | | 8.33 (5) | 8.33 (5) |
| Deionized water | | 27.8 | 27.8 |
| Color pigment | Titanium white | 20 | 20 |
| | Carbon black | 0.1 | 0.1 |
| | Tinuvin 900 (Note 1) | | 1 |
| | Tinuvin 770 (Note 2) | | 2 |
| Purified clay | | 3 | |
| Bismuth hydroxide | | 2 | 2 |
| Organotin compound | | 1 | 1 |
| 50% pigment paste | | 62.2 (31.1) | 62.2 (31.1) |

Solid content is parenthesized.
(Note 1) Tinuvin 900: trade name, marketed by Ciba Geigy Ltd., ultraviolet light absorber.
(Note 2) Tinuvin 770: trade name, marketed by Ciba Geigy Ltd., hindered amine based light stabilizer.

Preparation Example 11

A mixture of 93.3 parts (70 parts as solid content) of the 70% solid content amino group-containing epoxy resin No. 1 in Preparation Example 1, 33.3 parts (30 parts as solid content) of the cationic electrodeposition coating composition curing agent No. 1, 2.5 parts (one part as solid content) of liquid organotin and 8.2 parts of 10% formic acid was uniformly stirred, followed by dropping 178 parts of deionized water over about 15 minutes with agitation to obtain a 32.0% solid content emulsion No. 1.

Preparation Examples 12–18

Emulsions No. 2 to No. 8 were obtained according to the formulation as shown in Table 3 in the same manner as in Preparation Example 11.

Preparation Example 19

(Preparation Example of Cationic Electrodeposition Coating Composition No. 1)

The cationic electrodeposition coating composition having a solid content of 20% was prepared by mixing 157.7 parts (50.5 parts as solid content) of the 32% solid content emulsion No. 1 prepared in Preparation Example 11, 157.8 parts (50.5 parts as solid content) of the 32% solid content emulsion No. 4 prepared in Preparation Example 14, 70 parts (38.5 parts as solid content) of the 50% solid content pigment paste No. 1 and 304.9 parts of deionized water.

Preparation Examples 20 to 27

(Preparation Examples of Cationic Electrodeposition Coating Compositions No. 2 to No. 9)

Cationic electrodeposition coating compositions No. 2 to No. 9 were prepared according to the formulations as shown in Table 4.

TABLE 3

| | | Preparation Examples | | | | | | | |
|---|---|---|---|---|---|---|---|---|---|
| | | 11 | 12 | 13 | 14 | 15 | 16 | 17 | 18 |
| Emulsion | | No. 1 | No. 2 | No. 3 | No. 4 | No. 5 | No. 6 | No. 7 | No. 8 |
| Base resin | amino group-containing epoxy resin No. 1 | 93.3 (70) | 93.3 (70) | 93.3 (70) | | | | | 46.7 (35) |
| | amino group-containing acrylic resin No. 1 | | | | 93.3 (70) | | | | |
| | amino group-containing acrylic resin No. 2 | | | | | 93.3 (70) | | | 46.7 (35) |
| | amino group-containing acrylic resin No. 3 | | | | | | 93.3 (70) | | |
| | amino group-containing acrylic resin No. 4 | | | | | | | 93.3 (72) | |
| Curing agent | Curing agent No. 1 | 33.3 (30) | | 33.3 (30) | | | | | 16.65 (15) |
| | Curing agent No. 2 | | 33.3 (30) | | 33.3 (30) | 33.3 (30) | 33.3 (30) | 33.3 (30) | 16.65 (15) |
| Catalyst | organotin | 2.5 (1) | 2.5 (1) | 2.5 (1) | 2.5 (1) | 2.5 (1) | 2.5 (1) | 2.5 (1) | 2.5 (1) |
| Neutralizing agent | 10% formic acid <neutralization value> | 8.2 <10> | 8.2 <10> | 13.9 <17> | 13.9 <17> | 13.9 <17> | 13.9 <17> | 7.4 <9> | 11.5 <14> |
| Deionized water | | 178.3 | 178.3 | 172.6 | 172.6 | 172.6 | 172.6 | 179.1 | 174.9 |
| 32% emulsion | | 315.6 (101) | 315.6 (101) | 315.6 (101) | 315.6 (101) | 315.6· (101) | 315.6 (101) | 315.6 (101) | 315.6 (101) |
| Factor | resin | epoxy series | epoxy series | epoxy series | acrylic series | acrylic series | acrylic series | acrylic series | epoxy/acrylic |
| | neutralizing agent amount | low neutralization | low neutralization | high neutralization | high neutralization | high neutralization | high neutralization | low neutralization | medium neutralization |
| | curing agent type | aromatic series | alicyclic series | aromatic series | alicyclic series | alicyclic series | alicyclic series | alicyclic series | aromatic/alicyclic series |
| | amine-addition method | | | | DMAEMA used | | | | |
| | other | | | | | | high SP | | |

DMAENA: dimethylaminoethyl methacrylate

TABLE 4

| | | Preparation Examples | | | | | | | | |
|---|---|---|---|---|---|---|---|---|---|---|
| | | 19 | 20 | 21 | 22 | 23 | 24 | 25 | 26 | 27 |
| Cationic electrodeposition coating composition | | No. 1 | No. 2 | No. 3 | No. 4 | No. 5 | No. 6 | No. 7 | No. 8 | No. 9 |
| Formulation | emulsion No. 1 (epoxy series resin) | 157.8 (50.5) | 157.8 (50.5) | | 157.8 (50.5) | 157.8 (50.5) | | 157.8 (50.5) | 157.8 (50.5) | |
| | emulsion No.2 (epoxy series resin) | | | 157.8 (50.5) | | | | | | |
| | emulsion No. 3 (epoxy series resin) | | | | | | 157.8 (50.5) | | | |
| | emulsion No. 4 (acrylic series resin) | 157.8 (50.5) | | | | | | | | |
| | emulsion No. 5 (acrylic series resin) | | 157.8 (50.5) | 157.8 (50.5) | 157.8 (50.5) | 157.8 (50.5) | 157.8 (50.5) | | | |
| | emulsion No. 6 (acrylic series resin) | | | | | | | 157.8 (50.5) | | |
| | emulsion No. 7 (acrylic series resin) | | | | | | | | 157.8 (50.5) | |
| | emulsion No. 8 (epoxy acrylic series resin) | | | | | | | | | 315.6 (101) |
| | pigment paste No. 1 | 77 (38.5) | 77 (38.5) | 77 (38.5) | | 77 (38.5) | 77 (38.5) | 77 (38.5) | 77 (38.5) | 77 (38.5) |
| | pigment paste No. 2 | | | | 77 (38.5) | | | | | |
| | microemulsion | | | | | 25 (5) | | | | |
| | deionized water | 304.9 | ← | 304.9 | ← | 304.9 | ← | ← | ← | ← |
| | 20% cationic electrodeposition coating composition | 697.5 (139.5) | ← | 697.5 (139.5) | ← | 722.5 (139.5) | ← | ← | ← | ← |

Example 1

Cationic electrodeposition coating composition No. 1 was coated onto a cold-rolled steel plate treated with Palbond #3020 (trade name, marketed by Nippon Parkerizing Co., Ltd., zinc phosphate treatment) according to two stage energizing method comprising voltage increase to 100 V in 30 seconds, 100 V for 60 seconds, voltage increase 100 V to 250 V in 30 seconds and 250 V for 120 seconds, followed by heat-curing at 170° C. for 20 minutes to obtain a coating plate, which was subjected to tests as described in (Note 5) to (Note 7).

Examples 2–5, Comparative Examples 1–4

Coating plates of Examples 1–5 and Comparative Examples 1–4 were prepared according to combinations shown in Table 5. Additionally, respective coating plates were subjected to tests under the following test conditions. Test results are shown in Table 5.

TABLE 5(1)

| | | Examples | | | | | | | | |
|---|---|---|---|---|---|---|---|---|---|---|
| | | 1 | | 2 | | 3 | | 4 | | 5 |
| Evaluation of cationic electrodeposition coating composition comprising a sole emulsion | emulsion pigment paste | No. 1 No. 1 | No.4 ← | No. 1 ← | No. 5 ← | No. 2 ← | No. 5 ← | No. 2 No. 2 | No. 5 ← | No. 1 No. 1 + microemulsion | No. 5 |
| | (Note 3) difference in electrical quantity required for coating composition deposition starting (C/m$^2$) | 300 | 450 150 | 300 | 450 150 | 300 | 450 150 | 300 | 450 150 | 300 | 450 150 |
| | (Note 4) coating composition deposition starting time difference (s) | | 20 | | 20 | | 18 | | 18 | | 20 |
| | (Note 5) SP value difference of resin | | 0.9 | | 0.8 | | 0.8 | | 0.8 | | 0.8 |
| Evaluation of cationic electrodeposition coating composition comprising a combined emulsion | cationic electrodeposition coating composition | | No. 1 | | No. 2 | | No. 3 | | No. 4 | | No. 5 |
| | (Note 6) weather resistance | | ○ | | ○ | | ⊙ | | ⊙ | | ○ |

TABLE 5(1)-continued

|  |  | Examples | | | | |
|---|---|---|---|---|---|---|
|  |  | 1 | 2 | 3 | 4 | 5 |
|  | (Note 7) 60° gloss | 93 | 92 | 93 | 93 | 98 |
|  | (Note 8) corrosion resistance | ◯ | ◯ | ◯ | ◯ | ◯ |
|  | (Note 9) coating composition stability | ◯ | ◯ | ◯ | ◯ | ◯ |
|  | (Note 10) finished appearance | ◯ | ◯ | ◯ | ◯ | ◯ |

TABLE 5(2)

|  |  | Comparative Examples | | | | | | |
|---|---|---|---|---|---|---|---|---|
|  |  | 1 | | 2 | | 3 | | 4 |
| Evaluation of cationic electrodeposition coating composition comprising a sole emulsion | emulsion | No. 3 | No. 5 | No. 1 | No. 6 | No. 1 | No. 7 | No. 8 |
|  | pigment paste | No. 1 | ← | ← | ← | ← | ← | ← ← |
|  | (Note 3) difference in electrical quantity required for coating composition deposition starting (C/m²) | 410 40 | 450 | 300 150 | 450 | 300 40 | 340 | 400 |
|  | (Note 4) coating composition deposition starting time difference (s) | 5 | | 20 | | 10 | | |
|  | (Note 5) SP value difference of resin | 0.8 | | −0.1 | | 1.1 | | |
| Evaluation of cationic electrodepostion coating composition comprising a combined emulsion | cationic electrodeposition coating composition | No. 6 | | No. 7 | | No. 8 | | No. 9 |
|  | (Note 6) weather resistance | Δ | | Δ | | Δ | | Δ |
|  | (Note 7) 60° gloss | 75 | | 70 | | 75 | | 75 |
|  | (Note 8) corrosion resistance | Δ | | Δ | | Δ | | Δ |
|  | (Note 9) coating composition stability | Δ | | ◯ | | Δ | | Δ |
|  | (Note 10) finished appearance | Δ | | Δ | | Δ | | Δ |

\* Cationic electrodeposition coating composition comprising a sole emulsion:

Respective 20% solid content cationic electrodeposition coating compositions were separately prepared by mixing 315 parts of each of emulsions No. 1 to No. 8 constituting respective cationic electrodeposition coating compositions, 77 parts of pigment paste, and 304.9 parts of deionized water, followed by stirring at 30° C. and subjecting to aging for evaporating low-boiling point solvent.

(Note 3) Electrical quantity required for coating composition deposition starting: Electrical quantity required for coating composition deposition starting was determined for respective cationic electrodeposition coating compositions, followed by determining "difference" respectively.

(Note 4) Deposition starting time: Respective cationic electrodeposition coating compositions prepared in the same manner as in (Note 3) were subjected to a measurement of change in voltage by use of CCP500-1 (trade name, marketed by Takasago, Ltd., constant-current electrodeposition apparatus) capable of obtaining a constant current density, followed by a polarization resistance from voltage/current=polarization resistance, and measuring the deposition starting time when polarization resistance of respective cationic electrodeposition coating compositions start increasing.

(Note 5) Difference in SP value of resin: Respective SP values of resins were determined according to the calculating method described in the specification, followed by determining difference between SP value of epoxy resin and SP values of acrylic resin.

(Note 6) Weather resistance: A coating plate was subjected to an accelerated weather resistance test by a sunshine carbon arc lamp method according to JIS K-5400 9.8 for 2000 hours of irradiation to obtain a test panel. Squares of 1 mm were formed on the surface of the test panel, followed by subjecting to an adhesion test by use of a cellotape (trademark), showing results as follows.

⊚: Nothing abnormal, good

◯: No separation, edges cracked

Δ: 90–99/100 separated

•:90/100 separated (Note 7) 60° gloss: Specular reflection (%) was measured according to JIS K-5400 7.6 (1990).

(Note 8) Corrosion resistance: A coating plate was heat-cured at 170° C. for 20 minutes to obtain respective electrodeposition coating plates, followed by forming cross cuts on the surface of the electrodeposition coating film by use of a knife so as to reach the substrate, subjecting to a 840 hours salt water spray test, and evaluating development of rust from the cross cut, and width of blisters as follows.

○: maximum width of rust and blisters less than 2 mm from cut (one side)

Δ: maximum width of rust and blisters 2 mm or more less than 3 mm from cut (one side)

•: maximum width of rust and blisters 3 mm or more from cut (one side)

(Note 9) Coating composition stability: A coating composition circulating apparatus equipped with a laboratory test pump and UP (ultrafilter) module was assembled, followed by subjecting to UF filtration or ultrafiltration while returning filtrate to coating composition and circulating cationic electrodeposition coating compositions No. 1 to No. 6 for 3 hours, measuring filtration residue on 200 mesh filter. Evaluation was made as follows.

○: less than 10 mg/λ

Δ: 10 to 29 mg/λ

•: more than 29 mg/λ

(Note 10) Finished properties: Respective electrodeposition coating panel obtained by heat-curing at 170° C. for 20 minutes was visually evaluated as follows.

○: Normally deposited, smooth surface.

Δ: Normally deposited, but showing round feeling.

•: Abnormally deposited, surface roughening.

What is claimed is:

1. A multi-layer electrodeposition coating film-forming method which comprises subjecting a cationic electrodeposition coating composition containing at least two emulsions to an electrodeposition coating, said cationic electrodeposition coating composition being such that a difference in an electrical quantity (a) required for deposition starting between a first coating composition comprising a first emulsion and a second coating composition comprising a second emulsion in two emulsions selected from the at least two emulsions is in the range of 50 to 400 C/m$^2$.

2. A method as claimed in claim 1, wherein the cationic electrodeposition coating composition contains an emulsion (I) comprising an amino group-containing epoxy resin (A) and a blocked isocyanate curing agent ($C_1$); and an emulsion (II) comprising an amino group-containing acrylic resin (B) and a blocked isocyanate curing agent ($C_2$) same as or different from the curing agent ($C_1$).

3. A method as claimed in claim 2, wherein a solubility parameter (SP) value of the amino group-containing acrylic resin (B) is higher than a solubility parameter (SP) value of the amino group-containing epoxy resin (A) by 0.3 or more.

4. A method as claimed in claim 2, wherein the cationic electrodeposition coating composition contains an ultraviolet light absorber and/or a hindered amine based light stabilizer.

5. A method as claimed in claim 2, wherein the cationic electrodeposition coating composition contains a microemulsion prepared by water-dispersing a hydrolyzable alkoxysilyl group and a cationic group-containing acrylic copolymer.

6. A method as claimed in claim 2, wherein the electrodeposition coating is carried out by a multi-stage energizing method such that a difference between a coating constant-voltage ($V_1$) of a first stage and a coating constant-voltage ($V_2$) of a second stage in the multistage energizing method is 50 V or more, that a time ($t_1$) required for the coating constant-voltage ($V_1$) of the first stage is in the range of 10 to 120 seconds, and that a time ($t_2$) required for the coating constant-voltage ($V_2$) of the second stage is in the range of 60 to 170 seconds.

7. A method as claimed in claim 1, wherein the cationic electrodeposition coating composition contains an ultraviolet light absorber and/or a hindered amine based light stabilizer.

8. A method as claimed in claim 7, wherein the cationic electrodeposition coating composition contains a microemulsion prepared by water-dispersing a hydrolyzable alkoxysilyl group and a cationic group-containing acrylic copolymer.

9. A method as claimed in claim 7, wherein the electrodeposition coating is carried out by a multi-stage energizing method such that a difference between a coating constant-voltage ($V_1$) of a first stage and a coating constant-voltage ($V_2$) of a second stage in the multistage energizing method is 50 V or more, that a time ($t_1$) required for the coating constant-voltage ($V_1$) of the first stage is in the range of 10 to 120 seconds, and that a time ($t_2$) required for the coating constant-voltage ($V_2$) of the second stage is in the range of 60 to 170 seconds.

10. A method as claimed in claim 1, wherein the cationic electrodeposition coating composition contains a microemulsion prepared by water-dispersing a hydrolyzable alkoxysilyl group and a cationic group-containing acrylic copolymer.

11. A method as claimed in claim 10, wherein the electrodeposition coating is carried out by a multi-stage energizing method such that a difference between a coating constant-voltage ($V_1$) of a first stage and a coating constant-voltage ($V_2$) of a second stage in the multistage energizing method is 50 V or more, that a time ($t_1$) required for the coating constant-voltage ($V_1$) of the first stage is in the range of 10 to 120 seconds, and that a time ($t_2$) required for the coating constant-voltage ($V_2$) of the second stage is in the range of 60 to 170 seconds.

12. A method as claimed in claim 1, wherein the electrodeposition coating is carried out by a multi-stage energizing method such that a difference between a coating constant-voltage ($V_1$) of a first stage and a coating constant-voltage ($V_2$) of a second stage in the multistage energizing method is 50 V or more, that a time ($t_1$) required for the coating constant-voltage ($V_1$) of the first stage is in the range of 10 to 120 seconds, and that a time ($t_2$) required for the coating constant-voltage ($V_2$) of the second stage is in the range of 60 to 170 seconds.

* * * * *